United States Patent
Reed et al.

(10) Patent No.: US 6,557,089 B1
(45) Date of Patent: Apr. 29, 2003

(54) BACKUP BY ID-SUPPRESSED INSTANT VIRTUAL COPY THEN PHYSICAL BACKUP COPY WITH ID REINTRODUCED

(75) Inventors: David Charles Reed, Tucson, AZ (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 09/724,129

(22) Filed: Nov. 28, 2000

(51) Int. Cl.$^7$ .......................... G06F 12/16; G06F 17/30
(52) U.S. Cl. ........................................ 711/162; 707/204
(58) Field of Search .................. 707/204; 711/161, 711/162; 714/5, 6, 15

(56) References Cited

U.S. PATENT DOCUMENTS

| | | | |
|---|---|---|---|
| 5,546,557 A | 8/1996 | Allen et al. | 395/438 |
| 5,680,640 A | 10/1997 | Ofek et al. | 395/839 |
| 5,809,511 A | 9/1998 | Peake | 707/204 |
| 5,832,487 A | 11/1998 | Olds et al. | 707/10 |
| 5,835,954 A | 11/1998 | Duyanovich et al. | 711/162 |
| 5,946,689 A | 8/1999 | Yanaka et al. | 707/10 |
| 6,212,531 B1 * | 4/2001 | Blea et al. | 707/204 |
| 6,219,770 B1 * | 4/2001 | Landau | 711/162 |
| 6,226,759 B1 * | 5/2001 | Miller et al. | 714/6 |
| 6,366,987 B1 * | 4/2002 | Tzelnic et al. | 711/162 |
| 6,415,296 B1 * | 7/2002 | Challener et al. | 707/200 |

FOREIGN PATENT DOCUMENTS

| | | | |
|---|---|---|---|
| WO | WO98/48347 | 10/1998 | G06F/11/14 |
| WO | WO99/26143 | 5/1999 | G06F/12/08 |

OTHER PUBLICATIONS

Article entitled "Backing Up Migrated Data Sets" in the IBM Technical Disclosure Bulletin, vol. 24, No. 11A, dated Apr., 1982.
Article entitled "Migrated Data Backup Utility" in the IBM Technical Disclosure Bulletin, vol. 37, No. 06B, dated Jun., 1994.

* cited by examiner

Primary Examiner—Gary J Portka
(74) Attorney, Agent, or Firm—Dan Hubert & Assoc.

(57) ABSTRACT

A backup copy of a source data volume is created by first performing an instant virtual copy with source volume identifier (ID) suspended, then creating a physical tape backup copy from the instant virtual copy with the source volume ID being reintroduced. This creates an exact duplicate of the source volume with minimal impact on access to the source volume. Moreover, the resultant backup copy is less costly and error prone because it is created by a machine-automated process rather than various commands issued by a system administrator. In addition, by differentiating the volume IDs during intermediate copy steps, the invention is more fault tolerant since failure of the storage subsystem will not result in source and a temporary copy having confusingly indistinguishable volume IDs.

18 Claims, 5 Drawing Sheets

BACKUP BY ID-SUPPRESSED INSTANT VIRTUAL COPY THEN PHYSICAL BACKUP COPY WITH ID REINTRODUCED

BACKGROUND OF THE INVENTION

1. Field of the Invention

The present invention relates to the copying of data that resides in direct access storage devices ("DASDs"). More particularly, the invention concerns an automated, fault-tolerant method of creating a backup copy of a source DASD volume by first performing an instant virtual copy with source volume identifier (ID) suspended, then creating a non-virtual (physical) backup copy from the instant virtual copy with the source volume ID reintroduced.

2. Description of the Related Art

A number of DASD subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of any physical copy is completely unknown to the host.

Later, when the storage system receives updates to the original or copy, the updates are stored separately and cross-referenced to the updated data object only. At this point, the original and copy data objects begin to diverge. The initial benefit is that the virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

With such benefits, instant virtual copy has been an important development in modern DASD subsystems, and a number of different embodiments have surfaced. As one example, International Business Machines Corporation ("IBM") has developed the "FLASHCOPY" technique, as described in U.S. application Ser. No. 09/347,344, filed on Jul. 2, 1999 and entitled "Method, System, and Program for Maintaining Electronic Data as of a Point-In-Time." A different example is the "SNAPSHOT" technique disclosed in U.S. Pat. No. 5,410,667 entitled "Data Record Copy System for a Disk Drive Array Data Storage Subsystem," which issued on Apr. 25, 1995. The foregoing references are hereby incorporated herein by reference.

The instant virtual copy technique was developed, at least in part, to quickly create a duplicate copy of data without interrupting or slowing foreground processes. A natural extension of this function has been the creation of a non-virtual "backup" copy of the source data, to aid in disaster recovery. Under, one such technique, an operation such as "FLASHCOPY" or "SNAPSHOT" operation is used to perform an instant virtual copy operation; this creates a virtual target volume identical to the source volume in all respects, even including the volume ID of the source volume. Then, the target volume is taken off-line, which may occur automatically as a result of the instant virtual copy operation or manually at the direction of a system administrator. This is necessary because most systems do not allow multiple volumes with the same volume ID, in order to prevent confusion in uniquely identifying each data volume. After being taken off-line, the (virtual) target volume is used as a source to create a physical backup copy on tape. This may be achieved, for example, using an operation such as a BACKUP, DUMP, etc.

Although the foregoing technique is useful in some respects, there are still certain limitations. Namely, if the system fails prior to taking the (virtual) target volume off-line, confusion can result when the system is brought on-line because there will be two volumes with the same volume ID. Furthermore, if the source volume received any updates prior to system failure, there is a danger of losing these updates if the target volume is incorrectly taken to be the source volume.

A different approach has been developed to avoid the confusion of having both source and target volumes with the same volume ID. In this approach, an operator manually issues an instant virtual copy command with an associated command parameter that causes the system to create a target volume (instant) with a volume ID that differs from its source volume counterpart. This may be achieved, for example, using a "FLASHCOPY" command including a "NO VOLID" parameter. This creates an instant virtual copy of the source volume, but with a different volume ID. Next, the operator manually issues another command causing the storage system to create a physical backup copy of the "target" instant virtual copy. This may be achieved, for example, by using a appropriate command such as BACKUP, DUMP, etc. This creates a non-virtual (physical) backup volume that is identical to the source volume, except for having a different volume ID.

This presents some difficulties if the source volume fails and the backup volume is needed to restore the contents of the source. Namely, since the backup volume's volume ID does not match that of the failed source volume, a recovered backup volume would not be accessible to applications that expect the volume ID of the failed source volume, and the intended function of the restore operation would be defeated. Consequently, restoration of the backup volume requires the operator to perform the added manual operation of changing the recovered volume's volume ID to match that of the failed source volume. This may be done, for example, using the ICKDSF utility provided by the IBM DFSMShsm product. Alternatively, the backup volume's ID may be changed first, and then the volume restoration completed.

Although the foregoing technique is useful in some respects, there are still certain limitations. For one, success of this process requires certain operator input to occur at certain times. As with any process involving humans, the process incurs some risk of error merely because of the human factor. In addition, there are greater labor costs because of the need for human involvement rather than utilizing automated processes. Furthermore, the marketplace demands increasingly competitive, automated solutions to problems such as these.

For the foregoing reasons, then, known backup processes based on the instant virtual copy are not completely adequate for some applications due to certain unsolved problems.

SUMMARY OF THE INVENTION

Broadly, the present invention concerns an automated, fault-tolerant method of creating a physical backup copy of a source DASD volume by first performing an instant virtual copy with source volume ID suspended, then creating a non-virtual (physical) backup copy from the instant virtual copy with the source volume ID reintroduced.

According to the invention, the instant virtual copy may be performed using similar principles as a FLASHCOPY operation with the NO COPY VOLID option selected. This creates a virtual duplicate of the source volume on the DASD, minus the source's volume ID. Advantageously, novel operations are added to provide the virtual target volume with a hidden representation of the source volume ID. Next, the target volume is used as source for a physical copy operation to magnetic tape or other backup media. Importantly, this copy operation utilizes the hidden representation of the source volume ID to reintroduce the source's volume ID into the backup copy. The resultant backup copy on tape is an exact duplicate of the source volume. After completing the physical backup copy, the instant virtual copy is deleted by freeing data storage allotted to the instant virtual copy for use in other storage purposes. In the case of Home Area Architecture systems, deletion of the instant virtual copy may, for example, be performed using a WITHDRAW FLASH COPY RELATIONSHIP operation.

The foregoing features may be implemented in a number of different forms. For example, the invention may be implemented to provide a method of automated backup using a volume ID-suppressed instant virtual copy followed by a volume ID-reintroducing physical backup copy. In another embodiment, the invention may be implemented to provide an apparatus such as data storage subsystem programmed to perform the automated backup described herein. In still another embodiment, the invention may be implemented to provide a signal-bearing medium tangibly embodying a program of machine-readable instructions executable by a digital data processing apparatus to perform the automated backup copy described herein. Another embodiment concerns logic circuitry having multiple interconnected electrically conductive elements configured to perform the automated backup operations described herein.

The invention affords its users with a number of distinct advantages. For example, the backup operation of this invention minimally impacts the availability of the source volume because the source volume is initially copied using an instant virtual copy technique. As another advantage, the invention encourages fault tolerance because the source volume's ID is withheld from the target copy, and another volume ID is used instead. Thus, if the subsystem fails just after creating the target copy, the target copy is not likely to be confused with the source copy because they have different volume IDs. Moreover, the resultant tape backup copy is less costly and error prone because it is created by a machine-automated process rather than various commands issued by a system administrator. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Introduction

Figure 1A:
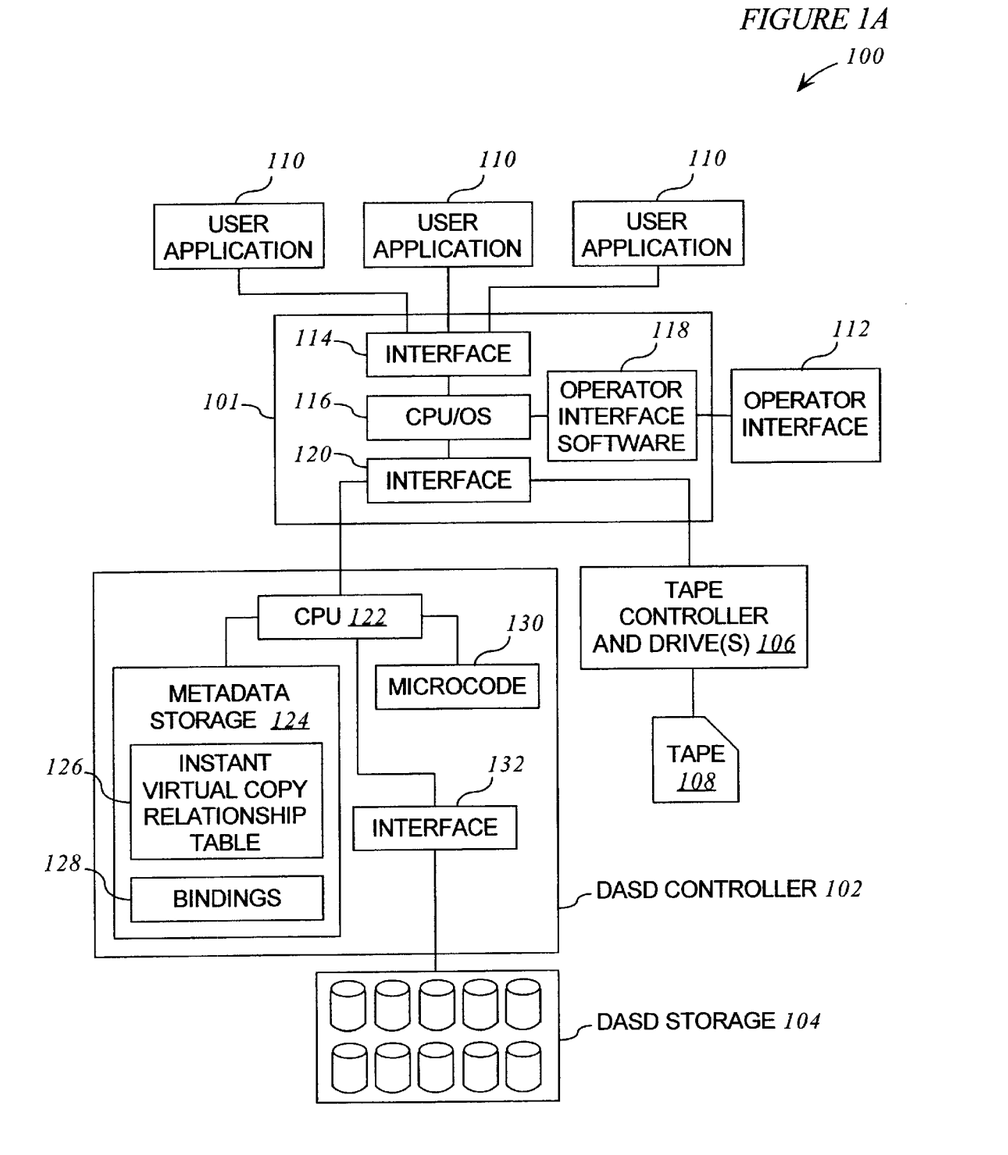
FIG. 1A is a block diagram of the hardware components and interconnections of a storage system according to the invention.

One aspect of the invention concerns a data storage system, which may be embodied by various hardware components and interconnections, with one example being described by the hierarchical storage system 100 of FIG. 1A. Broadly, the system 100 provides a storage hierarchy of different types of storage media for different storage purposes. In the illustrated example, the system 100 includes a storage manager 101, DASD storage 104, and tape storage 108. The storage manager 101 manages read/write operations upon DASD 104 and tape 108 storage in response to stimuli from external user applications 110, a system administrator via an operator interface 112, arid/or internal processes of the storage manager 101. The user applications 110 may comprise software programs, computing machines, human operator terminals, another device, or a combination of the foregoing. The operator interface 112 may include features such as a computer, input/output terminal, keyboard, video monitor, dials, switches, or other human/machine interface.

Storage Manager

As one example, the storage manager 101 may comprise a machine such as a storage manager component of an IBM brand S/390 machine. The storage manager 101 in this example includes a CPU 116, host interface 114, storage interface 120, and operator interface software module 118. As one example, the CPU 116 may utilize the IBM brand MVS operating system. The interface 114 conducts communications between the CPU 116 and the user applications 110, and comprises a suitable bus, fiber optic connector, backplane, intelligent channel, ESCON interface, SCSI interface, USB port, serial port, or other appropriate communications interface. Likewise, the interface 120 includes appropriate hardware to interface the CPU 116 with the storage controllers 102, 106 that manage the DASD 104 and tape 108 storage. The operator interface software module 118 receives commands entered at the operator interface 112 and processes the commands for use by the CPU 116. As an example, the software 118 may comprise the IBM brand TSO/dss software module.

Controllers & Storage

The tape controller and drive(s) 106 include tape controllers and tape read/write drives appropriate to carry out read/write operations upon removable serially accessible storage media, under direction of the storage manager 101. These serially accessible storage media are exemplified by magnetic "tape" in the present discussion. In this example, the tape controller 106 may comprise an IBM model 3590 device, where the storage media comprise magnetic tape cartridges.

The DASD controller 102 manages read/write operations upon DASD storage media 104 as directed by the storage manager 101. DASD storage 104 is exemplified by magnetic disk type storage in the present discussion, which may be implemented as a redundant array of inexpensive disks (RAID) storage. In this example, the DASD controller 102 and storage 104 may be implemented by using a commercially available product such as an IBM Enterprise Storage Server (ESS).

The DASD controller 102 has a number of subcomponents, including a CPU 122, metadata storage 124, microcode 130, and interface 132. The CPU 122 comprises an appropriate processing machine, such as a RS/6000 microprocessor. In response to receiving storage commands from the storage manager 101, the CPU 122 directs the DASD storage 104 to conduct read/write operations. In this respect, the interface 132 relays communications between the DASD storage 104 and CPU 122. The interface 132 may, for example, comprise a SCSI interface. The CPU 122 operates according to programming, which may be embodied in the form of microcode 130 as illustrated.

Metadata

The CPU 122 stores metadata in the metadata storage 124, in accordance with the read/write operations that are carried out in the DASD storage 104. Depending upon the size and manner of using the DASD storage 104, the metadata storage 124 may be embodied by nearly any type of non-volatile storage, such as magnetic disk storage, battery-supported RAM, optical storage, magnetic tape, etc. In the present example, the metadata storage 124 may be implemented by a magnetic hard disk drive. Contents of the metadata depend upon whether the storage system 100 utilizes storage of Log Structured Array (LSA) or Home Area Architecture.

In both Home Area Architecture and LSA implementations, the storage manager 101 manages data according to "volumes", which are actually "logical" volumes because they do not exist in any physical embodiment. Rather, the controller 102 receives data access requests from the storage manager 101 in terms of logical volumes, and implements the data access requests by translating them into terms of physical storage locations on the physical disks used to implement the DASD storage 104.

Figure 1B:
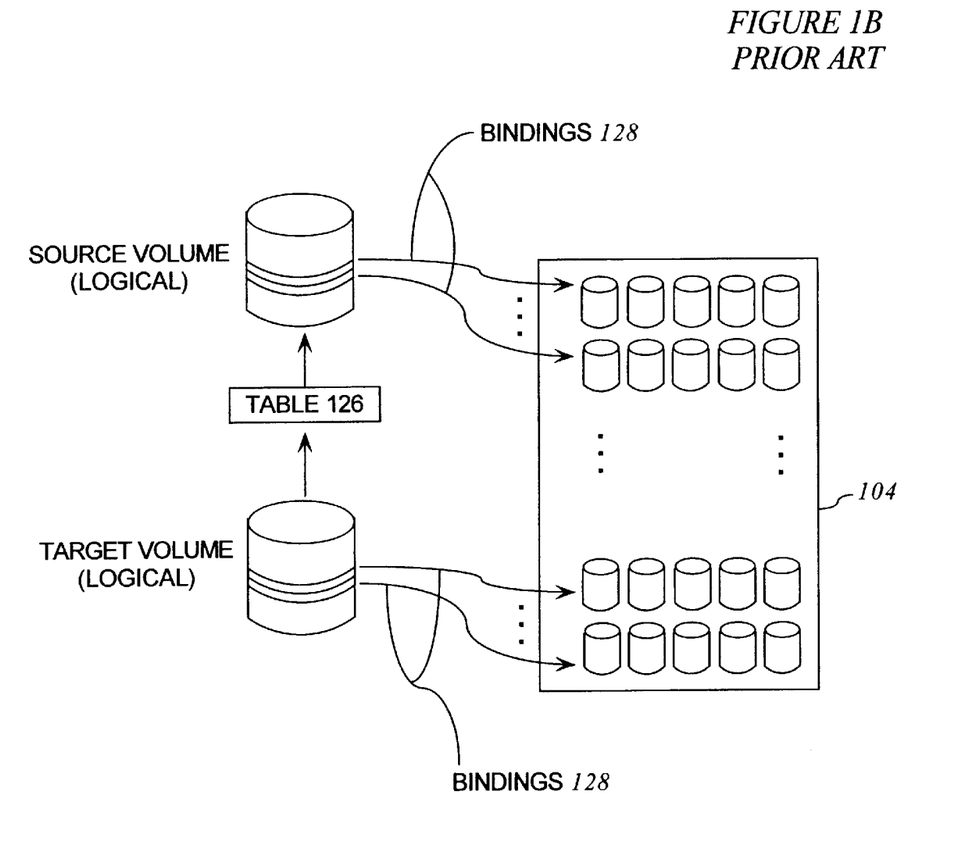
FIG. 1B is a more detailed block diagram showing the relationship between source and target volumes and physical storage, as known in the art.

FIG. 1B illustrates the Home Area Architecture approach in greater detail. With Home Area Architecture, the act of defining a logical volume uniquely associates the subparts (e.g., tracks) of that volume with a set of physical locations in the DASD storage 104. No two logical volumes may be associated with the same physical locations in DASD. These associations are listed in the bindings 128. In the Home Area Architecture environment, the instant virtual copy operation is known as "FLASHCOPY." When FLASHCOPY is performed, a logical target volume is created, with bindings separate from its source volume. Since the target volume cannot point to the source volume through its bindings (which must point to their exclusive storage sites on DASD 104), this role is filled by the relationship table 126. Namely, the relationship table relates each subpart (e.g., track) of the target volume with a corresponding subpart of the source volume. Therefore, even though the FLASHCOPY does not initially store any data in the DASD 104 sites bound to the target volume (i.e., they are left empty), the target volume virtually contains all data of the source volume since the target volume's subparts are associated with their source volume counterparts by the relationship table 126. As the target volume is updated over time, the target volume begins to diverge from its source volume; namely, these updates are stored in the DASD 104 sites bound to the target volume one by one, and the relationship listings 126 for these tracks are deleted one by one. As shown below, TABLE 1 shows an exemplary relationship table 126 when the instant virtual copy is first made, and TABLE 2 shows the state of that same relationship table after various updates to the target volume.

TABLE 1

HOME ARCHITECTURE RELATIONSHIP TABLE WHEN TARGET VOLUME FIRST MADE

| LOGICAL TRACK OF TARGET VOLUME (INSTANT VIRTUAL COPY) | WHERE DATA FOR THIS TARGET VOLUME LOGICAL TRACK IS FOUND | |
|---|---|---|
| | COUNTERPART LOGICAL TRACK OF SOURCE VOLUME | DATA ON DASD AT SITE IDENTIFIED BY BINDINGS? |
| track 1 | track 1 | no |
| track 2 | track 2 | no |
| track 3 | track 3 | no |
| ... | ... | ... |

TABLE 2

MATURE RELATIONSHIP TABLE FOR HOME ARCHITECTURE

| LOGICAL TRACK OF TARGET VOLUME (INSTANT VIRTUAL COPY) | WHERE DATA FOR THIS TARGET VOLUME LOGICAL TRACK IS FOUND | |
|---|---|---|
| | COUNTERPART LOGICAL TRACK OF SOURCE VOLUME | DATA ON DASD AT SITE IDENTIFIED BY BINDINGS? |
| track 1 | track 1 | no |
| track 2 (updated) | N/A | yes |
| track 3 (updated) | N/A | yes |

In contrast with Home Area Architecture, each logical volume in a LSA system may be bound to any set of physical DASD locations, whether another logical volume is also bound to these locations or not. Therefore, the relationship table 126 is unnecessary when the DASD 104 is configured as a LSA. In the LSA environment, the instant virtual copy operation is known as "SNAPSHOT." When SNAPSHOT is performed, a logical target volume is created, and bindings are generated so that the logical target's tracks are bound to the same DASD tracks as the source volume. As with the home architecture situation, the bindings are kept in the bindings 128. As the LSA target volume receives updates over time, the target volume can diverge from its source by storing these updates in new tracks of the DASD 104 and then redirecting the target volume's bindings to the tracks.

Exemplary Digital Data Processing Apparatus

As mentioned above, various types of hardware devices may be used to implement computing components of the present invention such as the storage manager 101, DASD controller 102, tape controller 106, and the like. As one example, such computing components may be implemented by one or more digital data processing apparatuses, each as exemplified by the hardware components and interconnections of the digital data processing apparatus 200 of FIG. 2.

Figure 2:
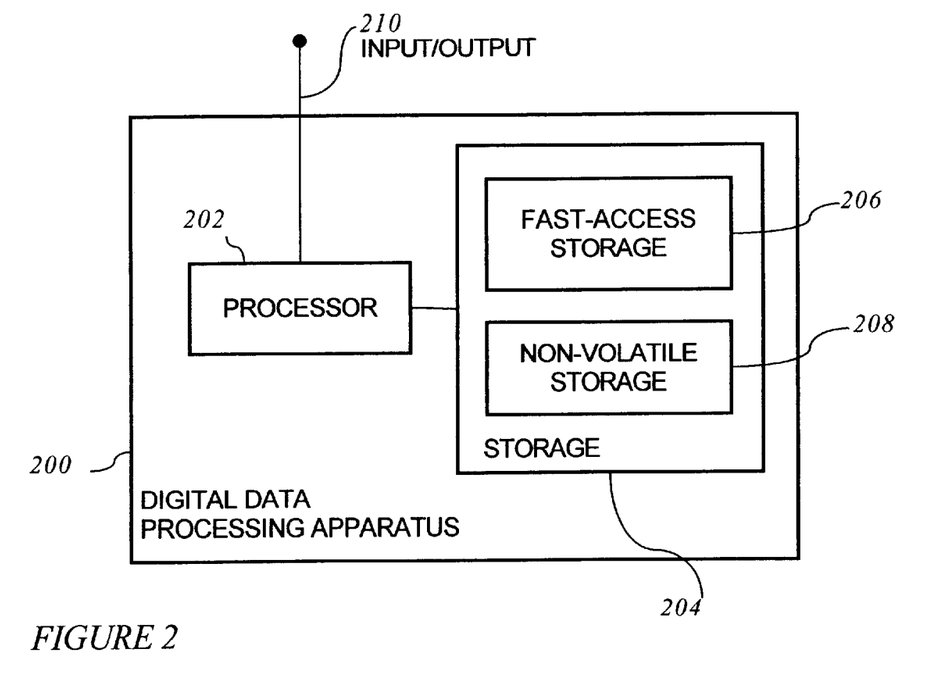
FIG. 2 is a block diagram of a digital data processing machine according to the invention.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the computing components of the system 100. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. As mentioned above, the method aspect of the invention generally involves an automated, fault-tolerant method of creating a backup copy of a source DASD volume by first performing an instant virtual copy with source volume ID suspended, then creating a non-virtual backup copy from the instant virtual copy with the source volume ID reintroduced. Although the present invention has broad applicability to digital data storage systems, the specifics of the structure that has been described is particularly suited for magnetic disk storage devices with tape backup, and the explanation that follows will emphasize such an application of the invention without any intended limitation.

Signal-Bearing Media

In the context of FIGS. 1A and 2, such a method may be implemented, for example, by operating the CPU 122, as embodied by a digital data processing apparatus 200, to execute a sequence of machine-readable instructions. These instructions may reside in various types of signal-bearing media. In this respect, one aspect of the present invention concerns signal-bearing media embodying a program of machine-readable instructions executable by a digital data processor to perform an automated, fault-tolerant method of creating a backup copy of a source DASD volume by first performing an instant virtual copy with source volume ID suspended, then creating a non-virtual tape backup copy from the instant virtual copy with the source volume ID reintroduced.

Figure 3:
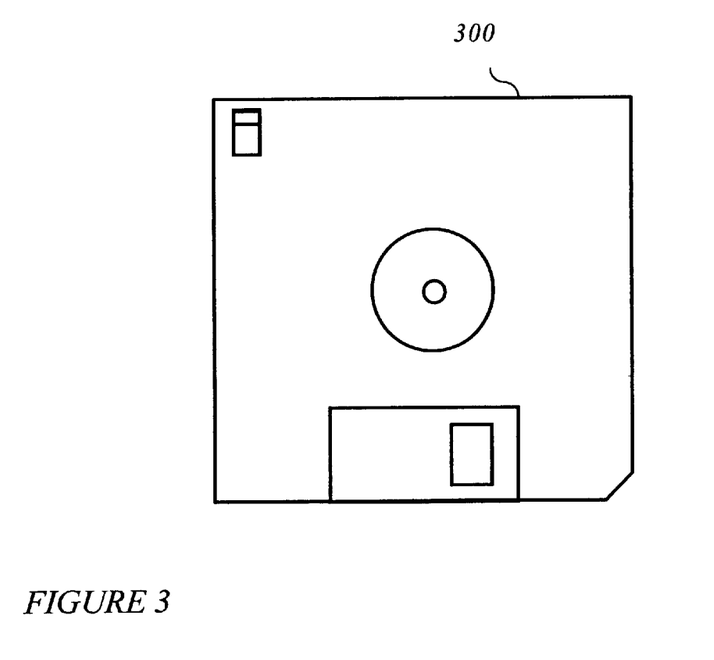
FIG. 3 shows an exemplary signal-bearing medium according to the invention.

This signal-bearing media may comprise, for example, RAM (not shown) contained within the CPU 122, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media. Some examples include as direct access storage (e.g., a conventional "hard drive", RAID array, or another DASD), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media including analog or digital transmission media and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the CPU 122, and is configured to perform operations to implement the method of the invention. The logic circuitry may be implemented using many different types of circuitry, as discussed above.

Operating Sequence—Overview

Figure 4:
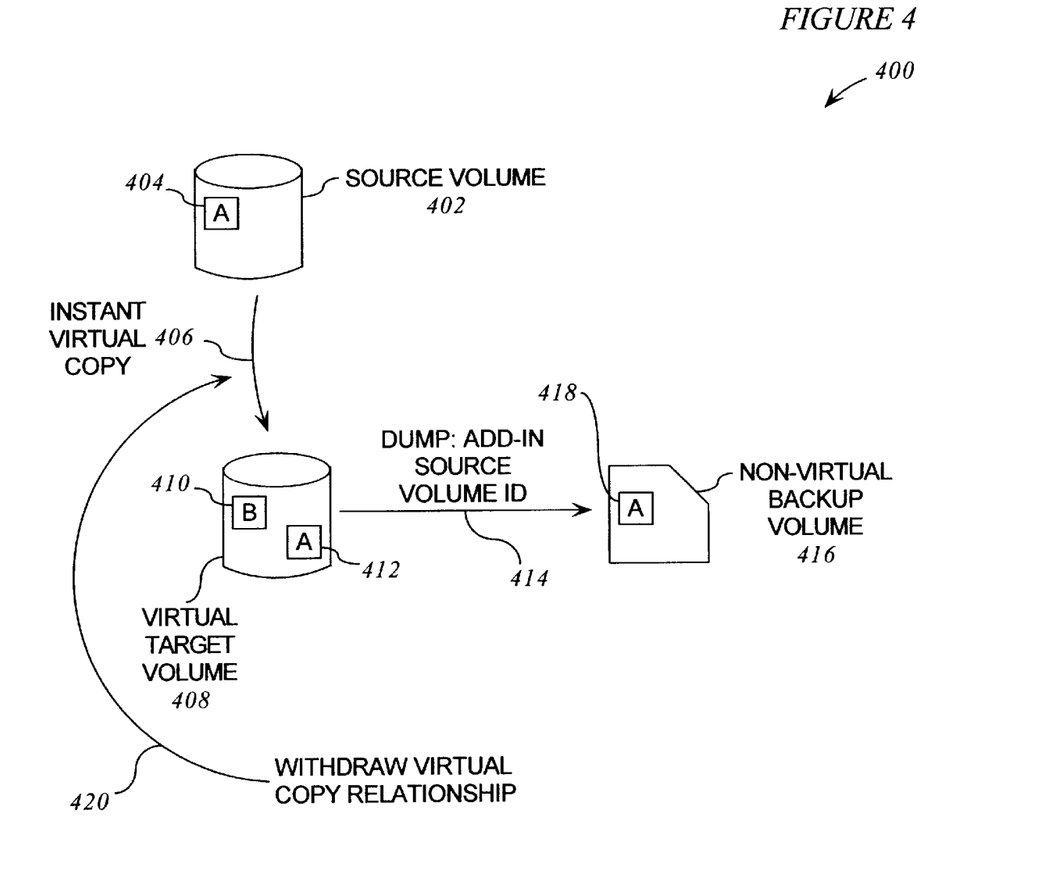
FIG. 4 is a block diagram showing an illustrative data volume during various stages of the backup process of this invention.

FIG. 4 utilizes a block diagram to illustrate the operation of the invention. Broadly, the invention conducts an automated, fault-tolerant method of creating a backup copy of a source DASD volume by first performing an instant virtual copy with source volume ID suspended, then creating a non-virtual tape backup copy from the instant virtual copy with the source volume ID reintroduced.

The source volume is represented by 402. The source volume 402 comprises a logical volume, whose physical manifestation is actually present on various disks in the DASD 104. The metadata storage 124 maintains bindings 128 linking the logical locations of the source volume and physical sites on the DASD storage 104; these bindings may be initiated and managed according to principles known to those skilled in the relevant art. The source volume contains a volume ID 404, the content of which is "A" in this example.

Initially, the storage system 100 performs an instant virtual copy operation 406 such as FLASHCOPY or SNAPSHOT. Included with the instant virtual copy operation are parameters appropriate to prevent the volume ID 404 from being carried over as the volume ID of the target volume 408. This operation results in the virtual target volume 408 whose volume ID 410 has different contents than the source volume's ID 404. In this example, contents of the target volume ID 410 are "B." As part of the instant virtual copy operation 406, contents of the volume ID 404 are copied to the target volume 408, albeit into a hidden location 412 that is not designated as being the site of the volume ID.

Next, an operation 414 is performed to create a non-virtual backup volume 416 by copying the target volume 408. This operation 414 locates the hidden volume ID 412 and re-introduces it into the non-virtual backup volume 416. The result is a non-virtual backup volume 416 that is logically identical to the source volume 402.

After step 414, an added step 420 may be performed in the case of Home Area Architecture systems. Namely, step 420 withdraws the FLASHCOPY relationship by deleting contents of the relationship tables 126 pertaining to the virtual target volume 408. If deletion of the target volume 408 is later desired, whether the system uses Home Area Architecture or LSA, the bindings 208 associating the target volume 408 with the DASD storage 104 may be deleted at that time.

Advantageously, this process encourages fault tolerance because the volume ID 404 of the source 402 is withheld from the target copy operation 406, and another volume ID 410 is used instead. Thus, if the subsystem fails just after creating the target volume 408, the target volume 408 is not likely to be confused with the source volume 404 because they have different volume IDs 404,410. Moreover, the operation is automated because the operations 406, 414, 420 can be implemented by a machine-performed sequence, free of any human operator input.

Operating Sequence—Details

Figure 5:
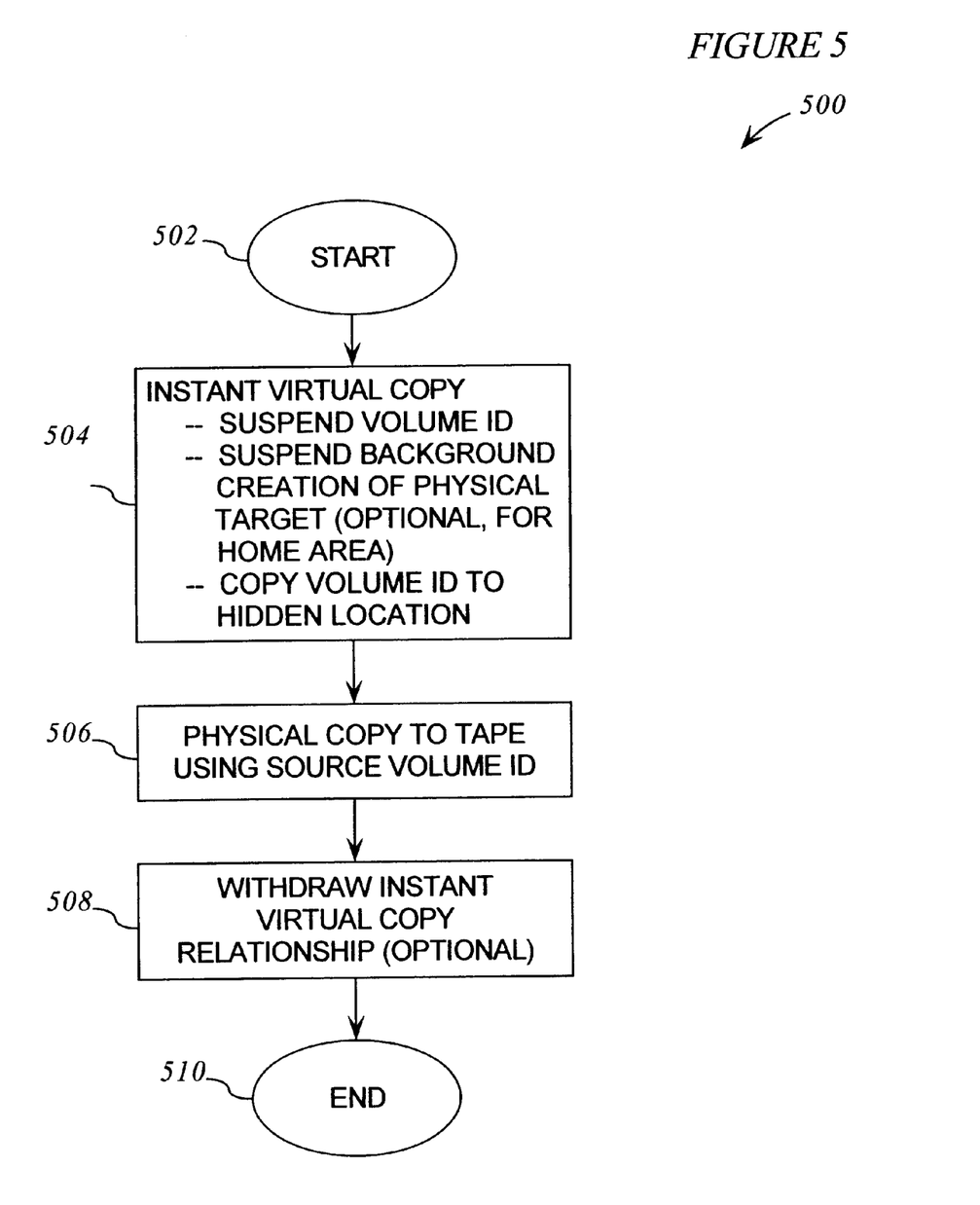
FIG. 5 is a flowchart of an operational sequence for automated backup using a volume ID-suppressed instant virtual copy followed by a volume ID-reintroducing non-virtual backup copy, according to the invention.

FIG. 5 shows an exemplary sequence 500 portraying one exemplary embodiment of fault-tolerant method for creating a backup copy of a source DASD volume by first performing an instant virtual copy with source volume ID suspended, then creating a physical tape backup copy from the instant virtual copy with the source volume ID reintroduced. For ease of explanation, but without any intended limitation, the example of FIG. 5 is described in the context of the system 100 described above (FIG. 1).

The routine 500 starts in step 502, in which certain input stimuli is received by the storage manager 101. The input stimuli identifies the source for which backup is desired. The source data may comprise one or more logical devices, physical devices, tracks, range(s) of tracks, datasets, pages, bytes, sectors, extents, or other data construct. For ease of illustration, the following discussion concerns "logical volumes."

Depending upon the needs of the application, step 502 may be triggered by various stimuli, such as a condition, event, request or output from a remote machine, user application 110, networked machine, etc. Alternatively, step 502 may also be triggered by a command manually entered by an operator at the interface 112. The input stimuli includes an identification of the desired source volume 404, various execution-specific parameters, and the like. As an example, the input stimuli may comprise receipt by the storage manager 101 of the following command input: "FLASHCOPY WITH SAFE BACKUP."

Responsive to receiving the stimuli of step 502, certain operations are performed. In one example, the ensuing tasks 504–510 are performed automatically without any required operator input. In this example, the storage manager 101 responds to the input stimuli by directing the CPU 122 to perform step 504. Namely, the CPU 122 performs an instant virtual copy of the identified source volume 404. The instant virtual copy of step 504 is performed in a manner that prevents the source volume ID 404 from being carried over to the target volume 408. In the LSA environment, step 504 may be performed by invoking the SNAPSHOT operation with the "NO COPY VOLID" option. In the Home Area Architecture environment, step 504 may be performed by using FLASHCOPY with the "NO COPY VOLID" option. Optionally, in the Home Area Architecture case, the "NO COPY" option may also be invoked, to prevent the commencement of any background operations to automatically create a non-virtual (physical) copy of the virtual volume. Another option, discovered by the present inventors and unknown in the prior art, is also invoked by step 504 to copy contents of the volume ID 404 to a hidden location in the target volume 408. This location is "hidden" because the CPU 122 is not programmed to recognize this location as being the site of the volume ID. To avoid interfering with the user data of the target volume, the source volume ID may be copied to a metadata site within the volume, such as a header, etc. As a specific example, this location may comprise a reserved but presently undesignated area of in the volume label. The operation 504 results in the virtual target volume 408 whose volume ID 410 has different contents than the source volume ID 404, contents of the source volume ID 404 being nonetheless present in the hidden location 412.

After the CPU 122 completes step 504, the storage manager 101 begins directing the creation of a non-virtual backup volume. This volume may be created on tape 108 (as illustrated), DASD 104, or another suitable backup storage location. In the illustrated example, the storage manager 101 (step 506) directs the DASD controller 102 and tape controller 106 to create a non-virtual backup volume 416 using the target volume 408 as a source for this operation. This may be achieved by executing a FULL VOLUME DUMP or BACKUP operation, for example. The storage manager 101 directs the controllers 102, 106 to enhance this operation, however, by reading the source volume ID 412 hidden in the target volume 408 and reintroducing the source volume ID 412 into the usual site 418 of the volume ID in the tape backup copy 418. The result is a non-virtual (physical) backup volume 416 that is logically identical to the source volume 402.

After step 506, an added step 508 may be performed in the case of Home Area Architecture systems. Namely, step 508 withdraws the FLASHCOPY relationship between the target and source volumes 404, 408 by deleting contents of the relationship table 126 pertaining to the virtual target volume 408. After step 508, the routine 500 ends in step 510.

Other Embodiments

While the foregoing disclosure shows a number of illustrative embodiments of the invention, it will be apparent to those skilled in the art that various changes and modifications can be made herein without departing. from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of creating a backup copy of a source data object including a first object identifier, comprising operations of:
    creating an instant virtual copy of the source object, the instant virtual copy including an object identifier different than the first object identifier and also including a hidden representation of the first object identifier; and
    creating a physical backup copy from the instant virtual copy comprising:
        utilizing the instant virtual copy as source to create a non-virtual backup copy;
        reading the hidden representation of the first object identifier from at least one of the following: the instant virtual copy, the backup copy; and
        reintroducing the first object identifier as the object identifier for the backup copy.

2. The method of claim 1, where the backup copy is created upon magnetic tape.

3. The method of claim 1, the hidden representation residing in a storage site in the instant virtual copy not designated for containing an object identifier.

4. The method of claim 1, where:
    the operation of creating the instant virtual copy includes generating Home Area Architecture bindings and instant virtual data copy relationships; and
    the operations further include withdrawing the instant virtual copy relationships.

5. The method of claim 1, where:
    the operations of creating the instant virtual copy and creating the physical backup copy are performed as an automated sequence responsive to a single input stimuli.

6. The method of claim 1, the source data object comprising a logical volume of data.

7. A backup process for use in a data storage system where data objects each include an object identifier, comprising operations of:
    creating an instant virtual copy of a source object and differentiating identifiers of the source object and the instant virtual copy, the differentiating operation including storing the identifier of the source object in the instant virtual copy in a storage site not designated for object identifier storage;
    creating a physical backup copy from the instant virtual copy, recalling the identifier of the source object from the storage site, and reintroducing the recalled identifier as identifier for the backup copy.

8. A signal-bearing medium tangibly embodying a program of machine-readable instructions executable by a digital processing apparatus to perform a method for creating a backup copy of a source data object including a first object identifier, said method comprising operations of:
    creating an instant virtual copy of the source object, the instant virtual copy including an object identifier different than the first object identifier and also including a hidden representation of the first object identifier; and
    creating a physical backup copy from the instant virtual copy comprising:
        utilizing the instant virtual copy as source to create a non-virtual backup copy;
        reading the hidden representation of the first object identifier from at least one of the following: the instant virtual copy, the backup copy; and
        reintroducing the first object identifier as the object identifier for the backup copy.

9. The medium of claim 8, where the backup copy is created upon magnetic tape.

10. The medium of claim 8, the hidden representation residing in a storage site in the instant virtual copy not designated for containing an object identifier.

11. The medium of claim 8, where:
    the operation of creating the instant virtual copy includes generating Home Area Architecture bindings and instant virtual data copy relationships; and
    the operations further include withdrawing the instant virtual copy relationships.

12. The medium of claim 8, where:
    the operations of creating the instant virtual copy and creating the physical backup copy are performed as an automated sequence responsive to a single input stimuli.

13. The medium of claim 8, the source data object comprising a logical volume of data.

14. A logic circuit of multiple interconnected electrically conductive elements configured to perform operations for creating a backup copy of a source data object including a first object identifier, said operations comprising:
    creating an instant virtual copy of the source object, the instant virtual copy including an object identifier different than the first object identifier and also including a hidden representation of the first object identifier; and
    creating a physical backup copy from the instant virtual copy comprising:
        utilizing the instant virtual copy as source to create a non-virtual backup copy;
        reading the hidden representation of the first object identifier from at least one of the following: the instant virtual copy, the backup copy; and
        reintroducing the first object identifier as the object identifier for the backup copy.

15. A storage system, comprising:
    at least one digital data storage interconnected to at least one storage controller; and
    a storage manager coupled to the storage controller, the storage manager being programmed to perform backup operations comprising:
        directing the controller to create in the storage an instant virtual copy of a source object that includes a first object identifier, the instant virtual copy including an object identifier different than the first object identifier and also including a hidden representation of the first object identifier; and
        directing the controller to create a physical backup copy from the instant virtual copy comprising:
            utilizing the instant virtual copy as source to create a non-virtual backup copy;
            reading the hidden representation of the first object identifier from at least one of the following: the instant virtual copy, the backup copy; and
            reintroducing the first object identifier as the object identifier for the backup copy.

16. The apparatus of claim 15, the digital data storage configured as Log Structured Array.

17. The apparatus of claim 15, the digital data storage configured as Home Area Architecture.

18. A storage system, comprising:
    first means for storing digital data;
    second means for controlling operation of the first means; and third means for performing backup operations by:
  directing the second means to create in the first means an instant virtual copy of a source object that includes a first object identifier, the instant virtual copy including an object identifier different than the first object identifier and also including a hidden representation of the first object identifier; and
  directing the second means to create a physical backup copy from the instant virtual copy comprising:
    utilizing the instant virtual copy as source to create a non-virtual backup copy;
    reading the hidden representation of the first object identifier from at least one of the following: the instant virtual copy, the backup copy; and
    reintroducing the first object identifier as the object identifier for the backup copy.

* * * * *